(12) United States Patent
Molla

(10) Patent No.: US 11,982,402 B2
(45) Date of Patent: May 14, 2024

(54) INTEGRATED SYSTEM FOR ONLINE DETECTION AND AUTOMATIC REMOVAL OF WATER AND PARTICULATE CONTAMINANTS FROM TURBINE OIL

(71) Applicant: SAUDI ARABIAN OIL COMPANY, Dhahran (SA)

(72) Inventor: Hasanur Jamal Molla, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 879 days.

(21) Appl. No.: 17/011,507

(22) Filed: Sep. 3, 2020

(65) Prior Publication Data

US 2022/0065397 A1  Mar. 3, 2022

(51) Int. Cl.
*F16N 39/00* (2006.01)
*B01D 17/02* (2006.01)
(Continued)

(52) U.S. Cl.
CPC ....... *F16N 39/005* (2013.01); *B01D 17/0205* (2013.01); *B01D 17/12* (2013.01);
(Continued)

(58) Field of Classification Search
CPC .... F16N 39/005; F16N 39/04; F16N 2200/20; F16N 2270/50; B01D 17/0205;
(Continued)

(56) References Cited

U.S. PATENT DOCUMENTS 3,249,438 A * 5/1966 Topol ............... B01D 25/284
55/421
4,089,662 A * 5/1978 Williams ............ B01D 1/22
196/132
(Continued)

FOREIGN PATENT DOCUMENTS

CA 2291763 C 7/2002
CN 2308435 Y 2/1999
(Continued)

OTHER PUBLICATIONS

KR-101965329-B1—Machine translation (Year: 2019).*
(Continued)

*Primary Examiner* — Michael A Riegelman
(74) *Attorney, Agent, or Firm* — Osha Bergman Watanabe & Burton LLP

(57) ABSTRACT

A vacuum dehydrator for removing water from lube oil including a vacuum chamber having a contaminated lube oil contact zone, a lube oil inlet for introducing a water contaminated lube oil into the contact zone, a hot air inlet for introducing a heated air stream into the contact zone, a decontaminated oil outlet fluidly connected to the decontaminated oil collection zone, and a wet air outlet fluidly connected to the disengagement zone. The lube oil inlet and the hot air inlet are configured to introduce and contact the water contaminated lube oil and the hot air in the contact zone, producing a dehydrated oil received into the decontaminated oil collection zone and a wet air stream containing entrained oil droplets received into the disengagement zone.

(Continued)

US 11,982,402 B2

Page 2

The disengagement zone includes a tortuous divergent flow path traversing from a disengagement zone inlet to the wet air outlet.

20 Claims, 4 Drawing Sheets

(51) Int. Cl.
    *B01D 17/12*    (2006.01)
    *B01D 21/00*    (2006.01)
    *B01D 45/06*    (2006.01)
    *B01D 45/08*    (2006.01)
    *F16N 39/04*    (2006.01)

(52) U.S. Cl.
    CPC ......... *B01D 21/0027* (2013.01); *B01D 45/06* (2013.01); *B01D 45/08* (2013.01); *F16N 39/04* (2013.01); *F16N 2200/20* (2013.01); *F16N 2270/50* (2013.01)

(58) Field of Classification Search
    CPC .... B01D 17/12; B01D 21/0027; B01D 45/06; B01D 45/08
    See application file for complete search history.

(56) References Cited

U.S. PATENT DOCUMENTS

| | | | | |
|---|---|---|---|---|
| 4,678,588 A * | 7/1987 | Shortt | ................... | B01D 45/16 |
| | | | | 210/512.1 |
| 4,830,745 A * | 5/1989 | van der Meulen | ... | F16N 39/005 |
| | | | | 196/115 |
| 5,225,073 A * | 7/1993 | Billiet | .................. | B01D 61/145 |
| | | | | 210/260 |
| 5,252,229 A * | 10/1993 | Rojey | ................ | B01D 17/0217 |
| | | | | 210/512.3 |
| 5,840,198 A * | 11/1998 | Clarke | ............... | B01D 21/2422 |
| | | | | 210/522 |
| 5,858,169 A * | 1/1999 | Raehse | .................. | B01D 3/343 |
| | | | | 203/40 |
| 6,042,722 A * | 3/2000 | Lenz | ..................... | B67D 7/766 |
| | | | | 210/DIG. 5 |
| 6,080,273 A * | 6/2000 | Schrems | .................. | B01D 1/22 |
| | | | | 202/205 |
| 6,224,716 B1 * | 5/2001 | Yoder | ..................... | B01D 3/06 |
| | | | | 159/901 |
| 6,666,338 B1 * | 12/2003 | Henriksson | ............... | B04C 3/06 |
| | | | | 209/208 |
| 7,134,323 B1 * | 11/2006 | Discenzo | ........... | G01N 33/2888 |
| | | | | 702/183 |
| 7,156,241 B2 * | 1/2007 | Hanks | .................. | B01D 17/045 |
| | | | | 210/DIG. 5 |
| 8,491,785 B2 * | 7/2013 | Evanovich | ....... | C10M 175/0058 |
| | | | | 210/207 |
| 8,496,740 B1 * | 7/2013 | Ball, IV | ............. | B01D 17/0208 |
| | | | | 96/183 |
| 9,480,936 B2 * | 11/2016 | Hanks | ................ | B01D 17/0211 |
| 2003/0164342 A1 * | 9/2003 | Mason | ................ | B01D 29/661 |
| | | | | 210/323.2 |
| 2005/0173337 A1 * | 8/2005 | Costinel | ............... | B01D 17/045 |
| | | | | 210/519 |
| 2006/0169031 A1 * | 8/2006 | Song | .................. | G01N 33/2888 |
| | | | | 73/53.05 |
| 2010/0275600 A1 * | 11/2010 | Speirs | ...................... | B01D 1/26 |
| | | | | 60/670 |
| 2012/0080363 A1 * | 4/2012 | Evanovich | ....... | C10M 175/0058 |
| | | | | 210/207 |
| 2019/0134553 A1 * | 5/2019 | Richter | .................. | B01D 45/08 |
| 2022/0065397 A1 * | 3/2022 | Molla | ..................... | B01D 1/16 |

FOREIGN PATENT DOCUMENTS

| | | | |
|---|---|---|---|
| CN | 106310768 A | | 1/2017 |
| CN | 106474772 A | | 3/2017 |
| CN | 106608705 A | | 5/2017 |
| CN | 210495499 U | | 5/2020 |
| DE | 3718385 A1 | | 3/1989 |
| EP | 3563045 A1 | | 11/2019 |
| JP | 2003083499 A | | 3/2003 |
| KR | 101965329 B1 | * | 4/2019 |
| KR | 101965329 B1 | | 4/2019 |
| WO | 1998031445 A1 | | 7/1998 |

OTHER PUBLICATIONS

Lopez, Patricia et al., "Low Cost Photonic Sensor for in-Line Oil Quality Monitoring: Methodological Development Process towards Uncertainty Mitigation", Sensors, MDPI, vol. 18, Jun. 2018, doi:10.3390/s18072015 (37 pages).

International Search Report and Written Opinion of the International Searching Authority issued in corresponding International Application No. PCT/US2020/053379, dated May 21, 2021 (14 pages).

* cited by examiner

INTEGRATED SYSTEM FOR ONLINE DETECTION AND AUTOMATIC REMOVAL OF WATER AND PARTICULATE CONTAMINANTS FROM TURBINE OIL

BACKGROUND

Contamination is a leading cause of equipment failure in the oil and gas industry. Contamination of equipment is, for example, a cause for corrosion, erosion, and other types of equipment failure.

Rotating and reciprocating equipment may utilize a lube oil system to provide lubrication to the moving parts. It is of utmost importance to immediately detect the contaminants present in lube oil, and instantly take the corrective action to remove them from lube oil in order to keep the integrity of the rotating equipment. The industry, however, relies on routine lube oil condition monitoring programs, where lead time is relatively high; therefor the contamination causes damage to the equipment before its identification and removal from lube oil system. Now, the industry is slowly moving towards on-line lubricant condition monitoring program where the condition of lube oil including presence of contaminants gets monitored continuously; however, it takes some time to carry out the corrective action after detecting the contaminants in lube through on-line lubricant condition monitoring program, and the contaminants may causes damage to the equipment before the contaminants are removed.

SUMMARY

In one or more aspects, embodiments disclosed herein relate to a vacuum dehydrator for removing water from lube oil, the vacuum dehydrator including a vacuum chamber having a contaminated lube oil contact zone intermediate a decontaminated oil collection zone and a disengagement zone, a lube oil inlet for introducing a water contaminated lube oil into the contact zone of the vacuum chamber, a hot air inlet for introducing a heated air stream into the contact zone of the vacuum chamber, a decontaminated oil outlet fluidly connected to the decontaminated oil collection zone, and a wet air outlet fluidly connected to the disengagement zone. The lube oil inlet and the hot air inlet are configured to introduce and contact the water contaminated lube oil and the hot air in the contact zone, producing a dehydrated oil received into the decontaminated oil collection zone and a wet air stream containing entrained oil droplets received into the disengagement zone, and the disengagement zone includes a tortuous divergent flow path traversing from a disengagement zone inlet to the wet air outlet.

In another aspect, embodiments disclosed herein relate to a lube oil system, the system including a lube oil reservoir, a circulation loop configured to circulate a lube oil from the lube oil reservoir to one or more machines and to return a contaminated lube oil from the one or more machines to the lube oil reservoir, a decontamination loop having a circulating pump for transporting contaminated lube oil from the lube oil reservoir to a vacuum dehydrator, a discharge pump for withdrawing lube oil via the decontaminated oil outlet, a vacuum pump fluidly connected to the wet air outlet and configured to apply a vacuum to the vacuum chamber of the vacuum dehydrator via the tortuous divergent path, a heater for providing heated air to the vacuum chamber of the vacuum dehydrator, a particulate separator configured to remove particulates from the dehydrated oil, producing a decontaminated oil, a flow line for returning decontaminated oil to the lube oil reservoir.

In yet another aspect, embodiments disclosed herein relate to a method of removing contaminants from a lube oil system, the method including measuring a water contamination level of a lube oil reservoir, measuring a particulate contamination level of the lube oil reservoir. The method during including selectively operating only a lube oil dehydration system when the measured water contamination level is above a set point, only a particulate removal system when the measured particulate contamination level is above a set point, and both the lube oil dehydration system and the particulate removal system when both the measured water contamination and particulate contamination levels are above respective set points.

Other aspects and advantages will be apparent from the following description and the appended claims.

DETAILED DESCRIPTION

In one aspect, embodiments disclosed herein relate to a vacuum chamber of a vacuum dehydrator. In another aspect, embodiments herein relate to systems and processes for the on-line detection and removal of water and particle contaminants in lube oil. In yet another aspect, embodiments herein are directed toward a unique vacuum chamber in a vacuum dehydrator and an integrated system for on-line detection of water and particle contaminants in lube oil, and automatic removal of both or either of water and particulate contaminants from lube oil immediately after its detection as per set conditions.

As noted above, lube oil systems may be used to provide lube oil to rotating and reciprocating equipment, such as pumps, compressors, and other equipment commonly used in oil and gas processing. The lube oil may be provided via a lube oil circulating system to one or more pieces of equipment from a lube oil reservoir containing a supply of the lube oil, and the circulating system may return contaminated lube oil from the equipment to the lube oil reservoir. Contaminants may include, for example, water, particulates, and a combination of water and particulates.

To maintain a quality of the lube oil, embodiments herein provide a contaminant removal system for removing water, particulates, or both, from the contaminated lube oil. The contaminant removal system may include a circulating pump, a vacuum chamber, a condenser, a vacuum pump, and a particulate removal system. The contaminant removal system may also include a sensor system, which may include a particulate sensor, a water sensor, or both. Contaminant removal systems herein may also include one or more of an air supply system, an air heater, and an oil heater. The system may further include control valves, as well as one or more control systems or processors to control operation of the contaminant removal system. Each of these various aspects of the system will be described further below.

Figure 1:
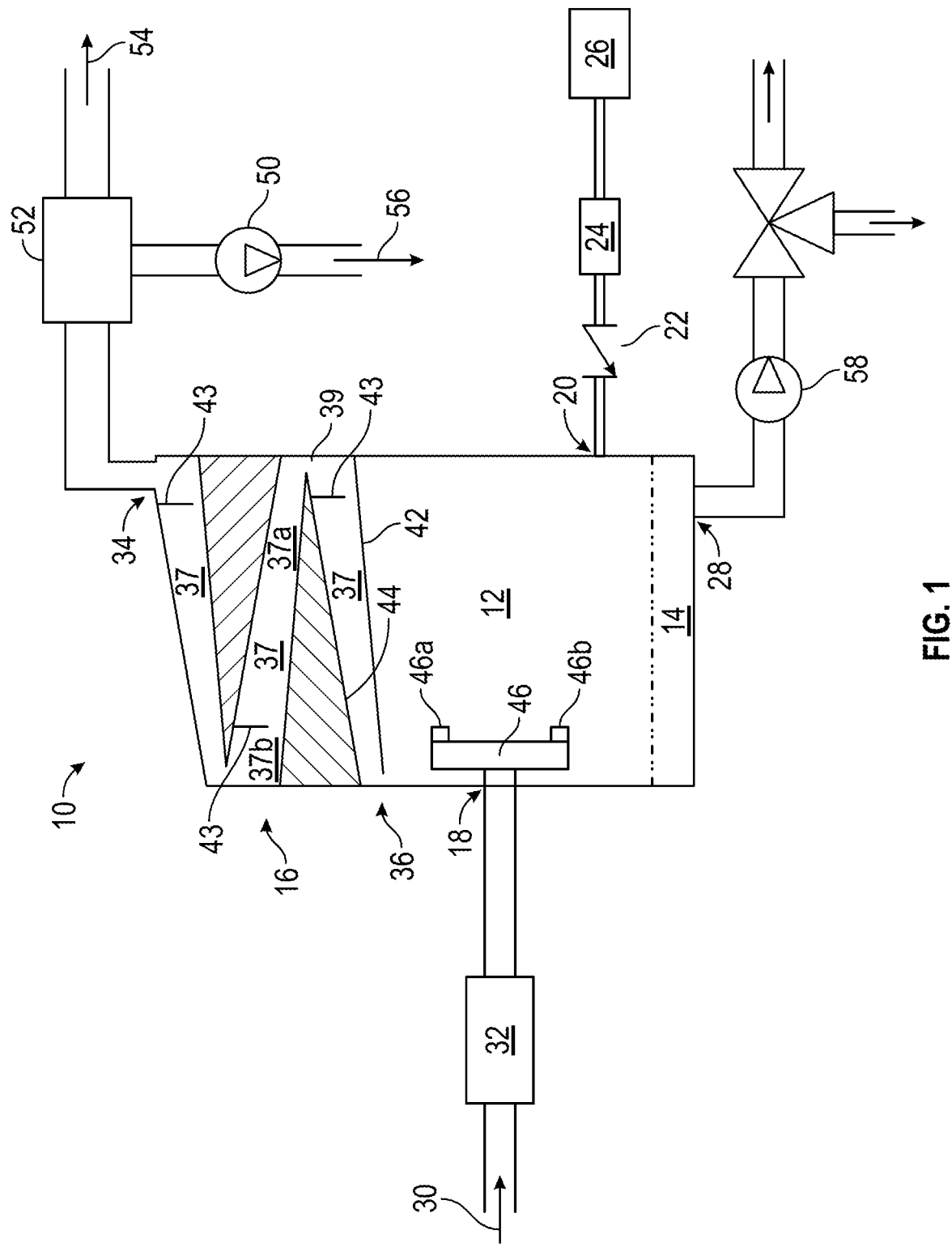
FIG. 1 is a simplified block diagram of a vacuum chamber and a vacuum dehydrator according to embodiments herein.

A vacuum chamber according to embodiments herein is illustrated in FIG. 1. The vacuum chamber 10 may include a contact zone 12 intermediate a lower decontaminated oil collection zone 14 and an upper disengagement zone 16. An inlet 18 may be provided for introducing a contaminated lube oil 30 into the contact zone 12. Further, an inlet 20 may be provided for introducing air into the contact zone. Contact of the air with water contaminated lube oil may result in extraction of some of the water from the lube oil into the air, resulting in a decrease in the water content of the lube oil.

The lube oil, depleted in water content, may accumulate at a lower end of the vacuum chamber in the decontaminated oil collection zone 14. An outlet 28 may be provided to withdraw the decontaminated lube oil from collection zone 14.

The air, enriched in water content, may traverse from the contact zone into the disengagement zone 16 and thence to wet air outlet 34. The disengagement zone 16 is provided to separate any entrained oil droplets from the wet air. This may allow the lube oil to wholly collect in the collection zone 14 and be recovered via outlet 28, thus preventing losses of lube oil during the dehydration process.

Disengagement zone 16 may include ducts, plates, or other flow conduits forming a tortuous flow path from the disengagement zone inlet (contact zone outlet) 36 to the wet air outlet 34. The tortuous flow path may include multiple passes 37 back and forth across the width of the vacuum chamber vessel, such as two, three, four, or more passes 37. Each pass may be formed as a divergent flow path, increasing in cross-sectional area from an inlet end 37a to an outlet end 37b of the flow path. The increase in cross-sectional area may result in the velocity of the wet air stream decreasing, allowing entrained oil droplets to fall onto and accumulate on a lower surface of the flow conduit. A lower surface of the flow conduit may also be inclined, relative to horizontal, thereby allowing any accumulated oil to flow via gravity back into the contact zone 12 and thence into the collection zone 14 for recovery and recirculation back to the lube oil supply tank via outlet 28.

In some embodiments, the tortuous flow path may be formed by inclined plates disposed in an upper end of the vacuum chamber vessel. The divergent flow path may be formed by a lower plate 42 and an upper plate 44 for example, where the upper plate 44 is disposed at a greater angle from horizontal than the lower inclined plate 42. Following traversal across the vacuum chamber vessel, a vertical run 39 may be provided to allow the vapor flow to turn and traverse back across the vessel in a subsequent inclined, divergent flow path 37. Each lower inclined plate forming the divergent flow path may be disposed at an angle in the range from 1° to 10° from horizontal, and each upper inclined plate is disposed at an angle in the range from 2° to 20° from horizontal, for example. Greater angles may also be used in other embodiments.

A baffle 43 may be disposed in each flow path 37. The baffles 43 may be disposed proximate a terminus of each inclined flow path, i.e., proximate a turn in the flow path, and may block an upper portion of the flow area, such as by extending downward from the upper surface of the flow conduit. For example, the baffles may be disposed within the last 10% of the flow path 37. The baffles may block up to 80% of the upper flow area within the flow path in some embodiments, for example.

The lube oil inlet 18 may include a nozzle 46 configured to disperse the contaminated lube oil into the contact area 12 in the form of droplets. The nozzle 46 may atomize the lube oil flow into droplets, for example, having an average particle size in the range from about 200 micrometers to about 1000 micrometers, such as in the range from about 300 micrometers to about 900 micrometers, or from about 400 micrometers to 800 micrometers.

In some embodiments, the inlet nozzle 46 may be a spiral nozzle. In some embodiments, two or more spiral nozzles 46a, 46b may be provided to create a swirling droplet pattern to maximize the lube oil droplets to exposure in the vacuum environment and to interact more with hot unsaturated air to ensure maximum removal of water from the lube oil. The spiral nozzle(s) may disperse the contaminated lube oil droplets, such as droplets having an average droplet diameter in the range from 400 micrometers to 600 micrometers into the contact zone. In various embodiments, the spiral nozzle may disperse the droplets with a spray angle of 60° to 120°, such as at a spray angle of 75° to 105°, for example 90°. The nozzles may be made of any suitable material, and in some embodiments may be made from AISI 316L stainless steel. An example of a spiral nozzle that may be useful in embodiments herein is spiral nozzle EBU XXXX B31 (where XXXX represents capacity of the nozzle to be selected based on system requirement), available from PNR Italia, among others.

The above-described vacuum chamber may be part of a vacuum dehydration system for removing water and other volatile contaminants from lube oil. The vacuum dehydration system may also include equipment associated with the contaminated oil feed, such as an oil heater 32. In some embodiments, the oil heater may include a low watt density electric heater, for example. Other types of heat exchangers known in the art may also be used to increase a temperature of the lube oil.

The dehydration system may also include an air feed unit that feeds air to the air feed inlet 20. In some embodiments, the air feed unit may include a breather 26, an air heater 24, and a check valve 22. Air heater 24 may also be an electric type heater, which may heat the incoming air through breather 26 in order to increase its moisture holding capacity, and check valve 22 may eliminate the back flow of a lube oil containing air stream or lube oil, eliminating or minimizing the fire hazard.

The dehydration system further includes a vacuum pump 50 to draw a vacuum within the vacuum chamber, drawing the wet air from the contact chamber 12, through the divergent ducts 37 and outlet 34. The wet air may then flow from outlet 34 to a condenser 52, where the moisture and any other condensable materials in the wet air may condense and be recovered via flow stream 54. The air may be discharged by the vacuum pump 50 into flow line 56, which may vent to atmosphere, if appropriate, or may transport the vapors to a flare system or other treatment system, if necessary.

Lastly, the dehydration system may include a discharge pump 58 for withdrawing the dehydrated lube oil from the collection zone 14 and circulating the dehydrated lube oil for further treatment or for return of the lube oil to the lube oil supply tank.

Figure 2:
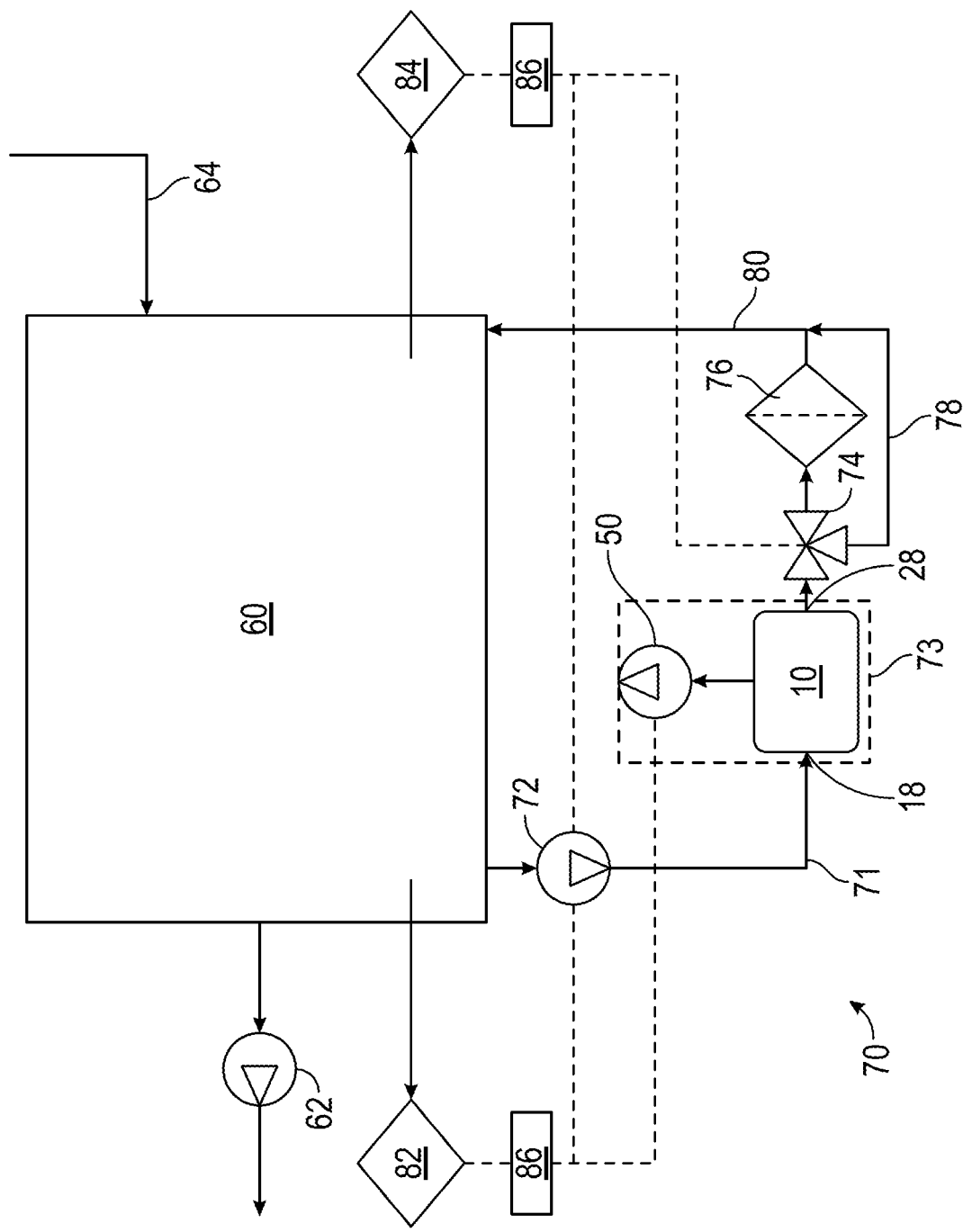
FIG. 2 is a simplified block diagram of a system for the on-line detection and removal of water and particle contaminants in lube oil according to embodiments herein.

The above described vacuum chamber and vacuum dehydration system may be used in a decontamination loop or contaminant removal system associated with a lube oil reservoir. A decontamination loop according to embodiments herein is illustrated in FIG. 2, where like numerals represent like parts. As noted above, the lube oil may be provided via a lube oil circulating system to one or more pieces of equipment, and as illustrated in FIG. 2, may be circulated from lube oil reservoir 60 via main lube oil pump 62 to the equipment, and the contaminated return oil from the equipment being lubricated may be fed to the lube oil reservoir 60 via lube oil return line 64. Contaminants such as water and particulates thus introduced into the lube oil reservoir may be removed from the lube oil via decontamination loop 70.

In some embodiments, such as illustrated in FIG. 2, decontamination loop 70 may include a circulating pump 72, a vacuum dehydration system 73 (including vacuum chamber 10, vacuum pump 50, condenser 52, heaters 24, 32, etc.), a three-way valve 74, and particulate removal system 76. Circulating pump 72 may circulate contaminated lube oil from reservoir 60 to the vacuum chamber 10 via flow line 71. Discharge pump 58 (see FIG. 1, associated with outlet 28 as illustrated in FIG. 2) may then withdraw dry lube oil from the collection zone of the vacuum chamber and may provide the lube oil to three-way valve 74. Three-way valve 74 may either feed the lube oil from discharge pump 58 to particulate removal system 76, or the three-way valve 74 may direct the flow of lube oil to bypass the particulate removal system 76 via flow line 78. The decontaminated lube oil may then be returned via flow line 80 to the lube oil reservoir 60.

A level of the contaminants within the lube oil reservoir may be measured, for example, using a water sensor 82 and a particle counter/sensor 84. Water sensors useful in embodiments herein may include, for example, a TRIBOMAR Infrared Water-in-Oil Online Sensor or Pall WS10 Series Water Sensor, among others. Particle counter/sensors useful in embodiments herein may include, for example, a PAMAS S50 Online particle counter, among others.

Contaminants may build within the lube oil reservoir at different rates. Water may accumulate at a faster rate in some embodiments, whereas particulates may accumulate at a faster rate in yet other embodiments. As such, it may not be necessary to operate the vacuum dehydration system or the particulate removal system at all times. Rather, based on the contaminant level, the vacuum dehydration system may be operational, the particulate removal system may be operational, or both the vacuum dehydration system and the particulate removal system may be operational.

In some embodiments, when either or both of the sensors 82, 84 indicate that a contaminant level is high, circulating pump 72 may be activated, circulating contaminated lube oil into the vacuum chamber 10. Discharge pump 58 may be operated on level control, for example, maintaining a desired liquid level within collection zone 14. As circulating pump 72 feeds lube oil into the vacuum chamber, level control results in discharge pump 58 feeding lube oil to three-way valve 74.

In other embodiments, when sensor 82 indicates that the water contaminant level is high, circulating pump 72 may be activated, circulating contaminated lube oil into the vacuum chamber 10. Additionally, when the water level in the lube oil reservoir is above a set limit, the vacuum pump 50, heaters 34, 32, and condenser 52 may be activated, thereby removing water from the lube oil. If the water level in the lube oil reservoir is below a set limit, the vacuum dehydration system may remain idle, and the combination of circulating pump 72 and discharge pump 58 may effectively circulate the lube oil via collection zone 14 to the three-way valve.

When sensor 84 indicates that the particle contaminant level is high, circulating pump 72 may be activated, circulating contaminated lube oil into the vacuum chamber 10. Additionally, when the particulate level in the lube oil reservoir is above a set limit, the three-way valve may be operated to permit flow of the lube oil from discharge pump 58 to proceed to particulate removal system 76. When the particulate level is below a set limit, the three-way valve may be operated to bypass flow of the lube oil around the particulate removal system 76 via flow line 78.

When both sensors 82 and 84 indicate contaminant levels above the respective set points, circulating pump 72 may be activated, and both the vacuum dehydration system and the particulate removal system may be activated and operational. In the above-described manner, the decontamination may be conducted on an as-needed basis for either or both particulate and water contamination.

Figure 3:
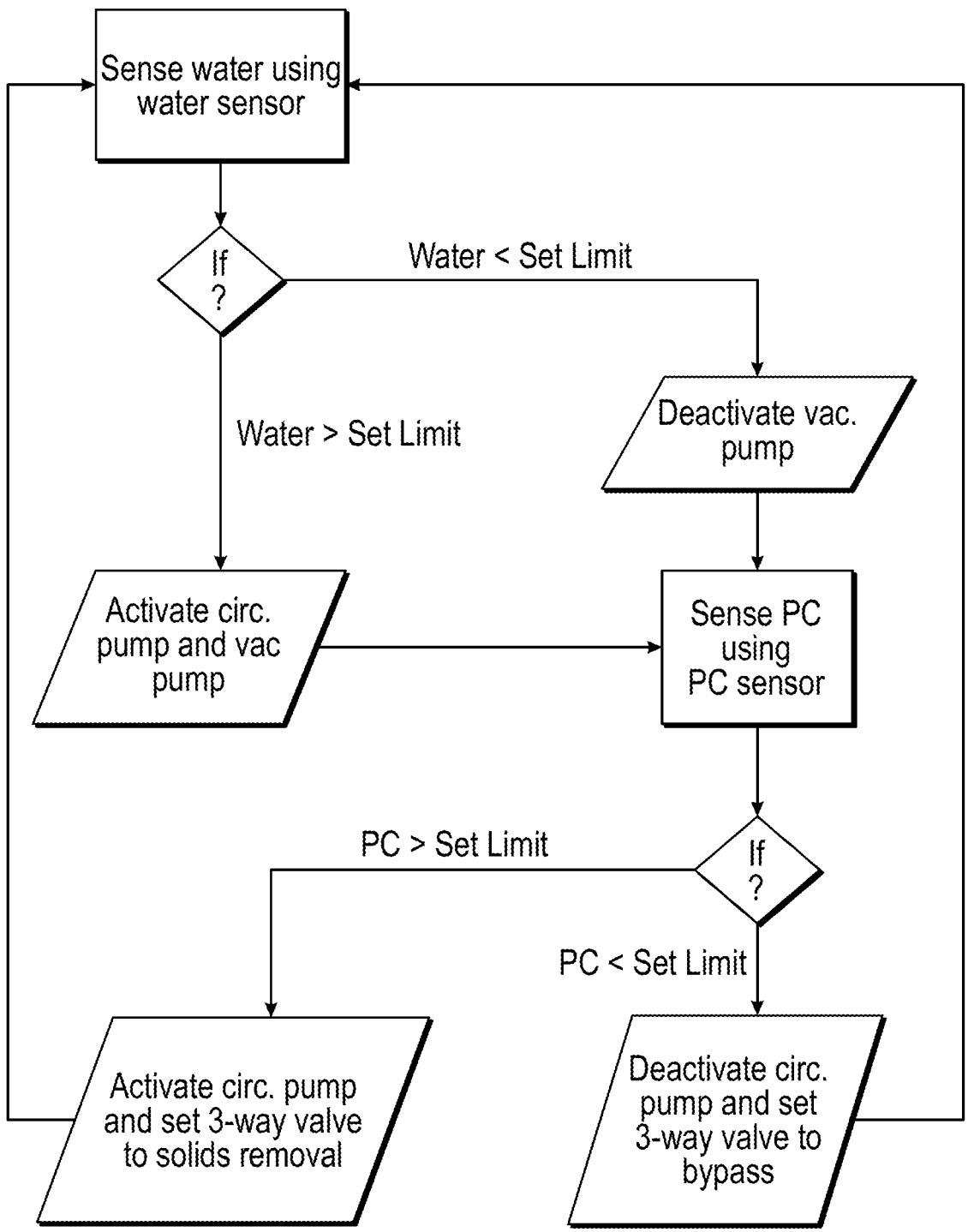
FIG. 3 is a flow diagram of a processor used to control systems for the on-line detection and removal of water and particle contaminants in lube oil according to embodiments herein.

The above-described logic for operating the decontamination loop based on water and particle sensor outputs is illustrated in FIG. 3.

While described above with respect to a three-way valve, one skilled in the art may readily recognize that two valves and appropriate piping may alternatively be used to arrive at a similar flow pattern and control.

In some embodiments, particulate removal system 76 may include one or more filters for removing particulates from the contaminated lube oil. In other embodiments, particulate removal system 76 may additionally or alternatively include electrostatic oil cleaners or balanced charge agglomeration, such as for removing insoluble particles including varnish. In yet other embodiments, particulate removal system 76 may additionally or alternatively include a system for removing particles via use of magnets or electromagnetic or magnetic field induction (magnetic particle separator).

Circulating pump 72 is a separate individual component of the system, not an integral part of vacuum dehydrator. Therefore, circulating pump 72 works independently irrespective of functioning of the vacuum dehydrator and ensures the lube oil circulation through the system for removal of both or either of the detected contaminants (water and particulates). Circulating pump 72 is activated when either or both water and particle contaminants are above set values. As the vacuum dehydration system (vacuum pump, oil and air heaters, and condenser) only run when the water content of the lube oil is above a set value, the energy usage of the system is reduced.

Operationally, the sensors 82, 84 may send output signals, based on contaminants level in lube oil, to respective processors 86, or collectively to a digital control system or similar computer-based system for controlling operation of the decontamination loop.

A command is sent to circulating pump 72 by processors 86 based on water and Particle Count (PC) in lube oil sensed through water sensor 82 and particle counter sensor 86, respectively. The circulating pump 72 gets activated when both or either of the detected contaminants, i.e., water and particle count, are more than a set value. When both contaminants detected by both sensors are below set values, then circulating pump 72 does not get activated, and the decontamination system is not operational.

The command from processor(s) 86 are sent to vacuum pump 50 based on water in lube oil sensed by water sensor 82, and activates vacuum pump 50 when the detected water in lube oil is above the set value. When the water detected through water sensor 82 is below the set value, the processor sends commands to deactivate vacuum pump 50, and vacuum dehydrator is not operational.

The vacuum pump operation may be integrated with electric heaters 24, 32 of the vacuum dehydration system. Electric heaters 24, 32 may be activated only when the vacuum pump 50 is activated and operational, otherwise the electric heaters 24, 32 may be deactivated.

The signal from particle counter sensor 84 is sent to processor 86 to control the three-way valve 74 upstream of particulate removal system 76, which may be a filter in some embodiments. The three-way valve 74 may operate only with 0% (closed) and 100% (open) opening options. When the particle count detected through particle counter sensor 84 is above a set value, then three-way valve 74 works with 100% opening, and the whole stream of lube oil passes through particulate removal system 76 to remove particle contaminants from the lube oil. However, when the detected particle count is below the set value, then three-way valve 74 works with 0% opening, and the whole stream of lube oil passes through the bypass line.

Embodiments of the decontamination loop illustrated herein may be used to maintain a concentration of particulates and water within the lube oil reservoir below a maximum concentration. While the tolerance for particulates and water may depend on the equipment being lubricated, set points may be selected, for example, to result in the lube oil in the lube oil reservoir being maintained with a water concentration of less than 200 ppmw or less than 50% water saturation (on a relative humidity (RH) basis). Set points may also be selected to maintain a particulate concentration of less than 17/15/12 as measured according to ISO 4406 and related to the 3-part ISO Code for maximum particle count (4 micrometer/6 micrometer/14 micrometer). In other words, the particulate concentration may be maintained such that there is a maximum of 1300 particles per milliliter greater than 4 micrometers, a maximum of 320 particles per milliliter greater than 6 micrometers, and a maximum of 40 particles per milliliter greater than 14 micrometers. The maximum particle count for each particle size range may be set to maintain particle counts less than those noted above in other embodiments, such as a 17/15/12 ISO target or less.

Figure 4:
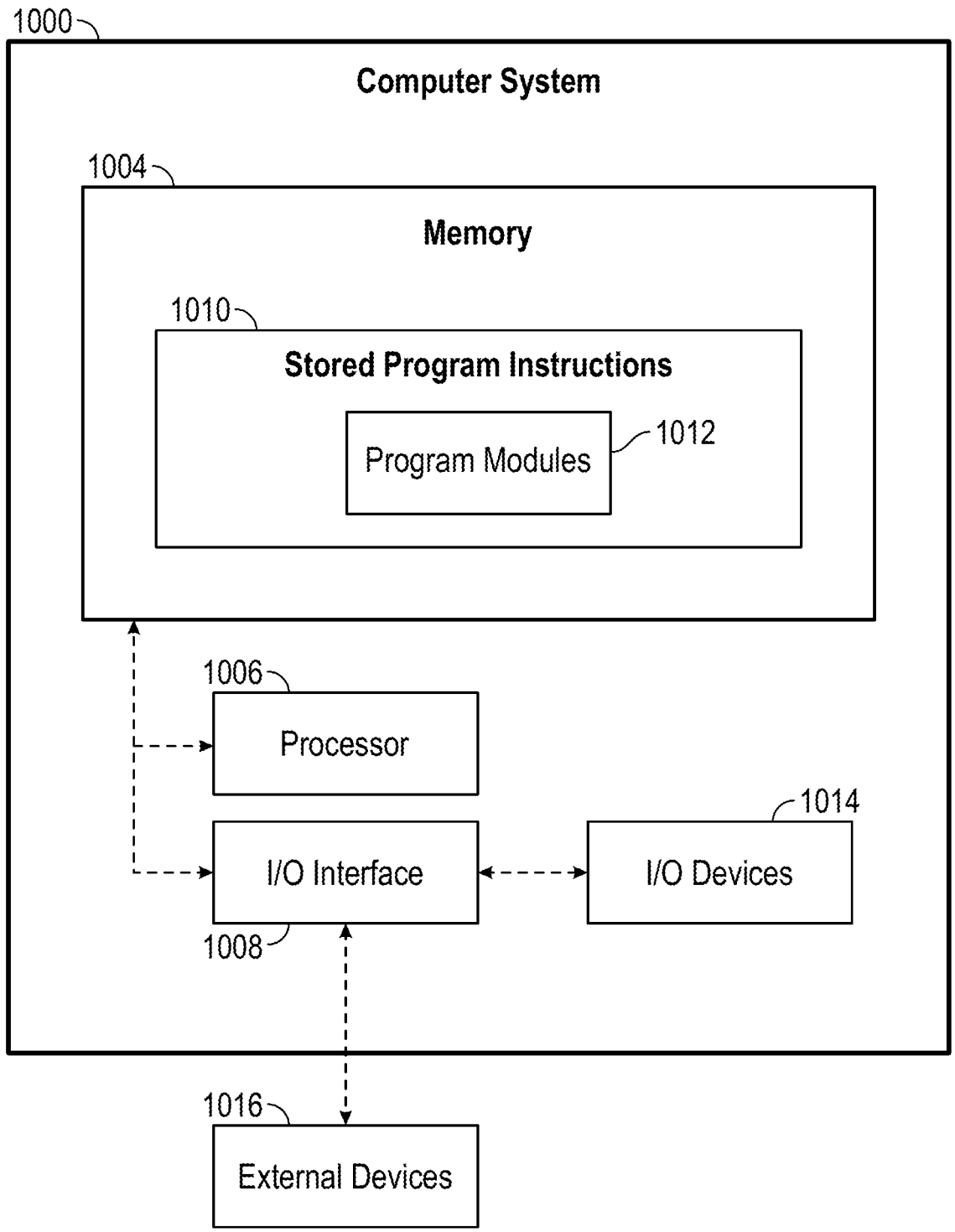
FIG. 4 is a diagram that illustrates an example computer system (or "system") in accordance with one or more embodiments

FIG. 4 is a diagram that illustrates an example computer system (or "system") 1000 in accordance with one or more embodiments. In some embodiments, the system 1000 is a programmable logic controller (PLC). The system 1000 may include a memory 1004, a processor 1006 and an input/output (I/O) interface 1008. The memory 1004 may include non-volatile memory (for example, flash memory, read-only memory (ROM), programmable read-only memory (PROM), erasable programmable read-only memory (EPROM), electrically erasable programmable read-only memory (EEPROM)), volatile memory (for example, random access memory (RAM), static random access memory (SRAM), synchronous dynamic RAM (SDRAM)), or bulk storage memory (for example, CD-ROM or DVD-ROM, hard drives). The memory 1004 may include a non-transitory computer-readable storage medium having stored program instructions 1010. The program instructions 1010 may include program modules 1012 that are executable by a computer processor (for example, the processor 1006) to cause the functional operations described, such as those described with regard to the system processors 86 as illustrated and described with respect to FIG. 2.

The processor 1006 may be any suitable processor capable of executing program instructions. The processor 1006 may include a central processing unit (CPU) that carries out program instructions (for example, the program instructions of the program modules 1012) to perform the arithmetical, logical, or input/output operations described. The processor 1006 may include one or more processors. The I/O interface 1008 may provide an interface for communication with one or more I/O devices 1014, such as a joystick, a computer mouse, a keyboard, or a display screen (for example, an electronic display for displaying a graphical user interface (GUI)). The I/O devices 1014 may include one or more of the user input devices. The I/O devices 1014 may be connected to the I/O interface 1008 by way of a wired connection (for example, an Industrial Ethernet connection) or a wireless connection (for example, a Wi-Fi connection). The I/O interface 1008 may provide an interface for communication with one or more external devices 1016. In some embodiments, the I/O interface 1008 includes one or both of an antenna and a transceiver. In some embodiments, the external devices 1016 include circulating pump 72, water sensor 82, particle counter sensor 86, vacuum pump 50, electric heaters 24, 32, and three-way valve 74 as illustrated in FIGS. 1 and 2, among other equipment associated with the decontamination loop.

As described above, embodiments herein provide a unique operational scheme integrating water and particulate sensors, control processors, and selective controlled operation of a vacuum dehydration system and a particulate removal system.

The vacuum chamber may contain two spiral nozzles to create a swirling droplet pattern to maximize the lube oil molecules exposure in the vacuum environment and interact more with hot unsaturated air to ensure maximum removal of water from lube oil. Electric heaters may also introduce heat to the incoming air through the breather in order to increase the airs moisture holding capacity, and a check valve may eliminate the back flow of lube oil containing air stream or lube oil to prevent fire.

The vacuum chamber disengagement zone at the top of the vacuum chamber may have baffle plates and divergent ducts through which saturated air and water vapor passes through towards the condenser. The combination of divergent ducts and baffle plates effectively reduces the velocity of the gaseous stream, and oil droplets fall out of the gaseous stream due to gravity. The divergent ducts may have an incline for collected oil droplets to flow back towards vacuum chamber. The disengagement zone may eliminate the carryover of oil mist, and may recover all entrained oil droplets carried along with the saturated air stream and water vapor, the recovered oil flowing back to vacuum chamber. Such a configuration improves the effectiveness of the vacuum dehydrator in terms of removing water from lube oil.

The decontamination system, as described above, shall be connected to rotating equipment's lube oil reservoir, such as in a kidney loop arrangement. The capacity of the vacuum dehydration system and the particulate removal system may depend upon the overall machine lubrication system requirements. Embodiments herein may detect the presence of water and particulate contaminants immediately after their ingress into the lube oil through the sensors, which sends the signal to the processors. The processors send commands to the circulating pump for its activation/deactivation based on contamination level in lube oil; and automatically starts circulating the lube oil through both or either of the vacuum dehydrator and the particulate removal system depending on contamination level in the lube oil, and sends back the clean lube oil to the lube oil reservoir after filtering out available water and particulate contaminants. The contaminants get removed from lube oil immediately after its detection by equipped sensors; and the contaminants get minimal time to cause any damage to the rotating equipment.

By treating the contaminants on an as-needed, real-time basis, contaminants present in the lube oil do not get enough time to cause any equipment damage, as they are immediately removed from the lube oil after their detection through in-line sensors effectively as per set conditions. The system also does not run continuously, it only runs when both or either of water and particle contamination levels in lube oil are above the set values; therefor, significant energy saving opportunity when oil only circulates through the filter to remove particles, when the vacuum dehydrator gets deactivated because of water in lube oil below a set, tolerable, value. The maintenance of the vacuum dehydrator will also be reduced as it is not running continuously.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed as new and desired to be protected by Letters Patent of the United States is:

1. A vacuum dehydrator for removing water from lube oil, the vacuum dehydrator comprising:
    a vacuum chamber comprising a contaminated lube oil contact zone intermediate a decontaminated oil collection zone and a disengagement zone;
    a lube oil inlet for introducing a water contaminated lube oil into the contact zone of the vacuum chamber;
    a hot air inlet for introducing a heated air stream into the contact zone of the vacuum chamber;
    a decontaminated oil outlet fluidly connected to the decontaminated oil collection zone; and
    a wet air outlet fluidly connected to the disengagement zone;
    wherein the lube oil inlet and the hot air inlet are configured to introduce and contact the water contaminated lube oil and the hot air in the contact zone, producing a dehydrated oil received into the decontaminated oil collection zone and a wet air stream containing entrained oil droplets received into the disengagement zone;
    wherein the lube oil inlet comprises one or more spiral nozzles configured to disperse a plurality of contaminated lube oil droplets into a contaminated oil contact zone;
    wherein the disengagement zone comprises a tortuous divergent flow path traversing from a disengagement zone inlet to the wet air outlet.

2. The vacuum dehydrator of claim 1, wherein the one or more spiral nozzles are configured to disperse the lube oil droplets into the contaminated lube oil contact zone with a spray angle in the range of 60° to 120°.

3. The vacuum dehydrator of claim 1, wherein the one or more spiral nozzles are configured to disperse into the contaminated lube oil contact zone lube oil droplets having an average droplet diameter in the range from 400 micrometers to 800 micrometers.

4. The vacuum dehydrator of claim 1, wherein the tortuous divergent flow path comprises two or more inclined flow paths, each including a lower inclined plate and an upper inclined plate, the upper inclined plate being disposed at a greater angle from horizontal than the lower inclined plate.

5. The vacuum dehydrator of claim 4, further comprising a baffle disposed in each inclined flow path.

6. The vacuum dehydrator of claim 5, wherein each baffle extends downward from the upper inclined plate.

7. The vacuum dehydrator of claim 6, wherein each baffle plate is disposed proximate a turn in the tortuous path.

8. The vacuum dehydrator of claim 4, wherein each lower inclined plate is disposed at an angle in the range from 1° to 10° from horizontal, and wherein each upper inclined plate is disposed at an angle in the range from 2° to 20° from horizontal.

9. A lube oil system, the system comprising:
    a lube oil reservoir;
    a circulation loop configured to circulate a lube oil from the lube oil reservoir to one or more machines and to return a contaminated lube oil from the one or more machines to the lube oil reservoir;
    a decontamination loop comprising:
        a circulating pump for transporting contaminated lube oil from the lube oil reservoir to a vacuum dehydrator as claimed in claim 1,
        the vacuum dehydrator, configured to receive contaminated lube oil from the circulating pump via the lube oil inlet;
        a discharge pump for withdrawing lube oil via the decontaminated oil outlet;
        a vacuum pump fluidly connected to the wet air outlet and configured to apply a vacuum to the vacuum chamber of the vacuum dehydrator via the tortuous divergent path;
        a heater for providing heated air to the vacuum chamber of the vacuum dehydrator;
        a particulate separator configured to remove particulates from the dehydrated oil, producing a decontaminated oil;
        a flow line for returning decontaminated oil to the lube oil reservoir.

10. The lube oil system of claim 9, further comprising a three-way valve disposed intermediate the discharge pump and the particulate separator, the three-way valve being configured to receive flow from the decontaminated oil outlet via the discharge pump and to direct the flow either (i) to the particulate separator or (ii) to the flow line for returning decontaminated oil to the lube oil reservoir, bypassing the particulate separator.

11. The lube oil system of claim 10, further comprising a particle counter sensor configured to measure a particle concentration of the lube oil in the lube oil reservoir and a water sensor configured to measure a water concentration of the lube oil in the lube oil reservoir.

12. The lube oil system of claim 11, further comprising a processor, wherein the processor is configured to:
    continuously or intermittently receive outputs of the water sensor and the particle counter sensor; and
    when a water concentration of the lube oil is greater than a water limit set point and a particle concentration is less than a particle limit set point, activate the circulating pump, the heater and the vacuum pump, thereby dehydrating the contaminated lube oil;
    when a particle concentration of the lube oil is greater than a particle limit set point and a water concentration of the lube oil is less than a water limit set point, activate the circulating pump and operate the three-way valve to permit flow from the decontaminated oil outlet to the particle separator; or
    when a water concentration of the lube oil is greater than a water limit set point and a particle concentration of the lube oil is greater than a particle limit set point, activate the circulating pump, the heater, and the vacuum pump, thereby dehydrating the contaminated lube oil, and operating the three-way valve to permit flow from the decontaminated oil outlet to the particle separator.

13. The lube oil system of claim 12, wherein the processor is further configured to deactivate the vacuum pump and the heater when a water concentration of the lube oil is less than a water limit set point.

14. The lube oil system of claim 12, wherein the processor is further configured to operate the three-way valve to bypass the particle separator when a particle concentration of the lube oil is less than a particle limit set point.

15. The lube oil system of claim 9, wherein the particle separator comprises one or more selected from the group consisting of a filter, an electrostatic oil cleaner, a balanced charge agglomeration system, a magnetic or electromagnetic particulate removal system, or a combination thereof.

16. A vacuum dehydrator for removing water from lube oil, the vacuum dehydrator comprising:
 a vacuum chamber comprising a contaminated lube oil contact zone intermediate a decontaminated oil collection zone and a disengagement zone;
 a lube oil inlet for introducing a water contaminated lube oil into the contact zone of the vacuum chamber;
 a hot air inlet for introducing a heated air stream into the contact zone of the vacuum chamber;
 a decontaminated oil outlet fluidly connected to the decontaminated oil collection zone; and
 a wet air outlet fluidly connected to the disengagement zone;
 wherein the lube oil inlet and the hot air inlet are configured to introduce and contact the water contaminated lube oil and the hot air in the contact zone, producing a dehydrated oil received into the decontaminated oil collection zone and a wet air stream containing entrained oil droplets received into the disengagement zone;
 wherein the lube oil inlet comprises one or more spiral nozzles configured to disperse a plurality of contaminated lube oil droplets into a contaminated oil contact zone;
 wherein the disengagement zone comprises a tortuous divergent flow path traversing from a disengagement zone inlet to the wet air outlet;
 wherein the tortuous divergent flow path comprises two or more inclined flow paths, each including a lower inclined plate and an upper inclined plate, the upper inclined plate being disposed at a greater angle from horizontal than the lower inclined plate.

17. The vacuum dehydrator of claim 16, further comprising a baffle disposed in each inclined flow path.

18. The vacuum dehydrator of claim 16, wherein each baffle extends downward from the upper inclined plate.

19. The vacuum dehydrator of claim 16, wherein each baffle plate is disposed proximate a turn in the tortuous path.

20. The vacuum dehydrator of claim 16, wherein each lower inclined plate is disposed at an angle in the range from 1° to 10° from horizontal, and wherein each upper inclined plate is disposed at an angle in the range from 2° to 20° from horizontal.

\* \* \* \* \*